(12) United States Patent
Daly et al.

(10) Patent No.: US 10,345,876 B2
(45) Date of Patent: Jul. 9, 2019

(54) COMPUTING DEVICE WITH REMOVABLE POWER MODULE

(71) Applicant: Microsoft Technology Licensing, LLC, Redmond, WA (US)

(72) Inventors: Gregory M. Daly, Seattle, WA (US); Michael Grassi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/443,909

(22) Filed: Feb. 27, 2017

(65) Prior Publication Data

US 2018/0107259 A1 Apr. 19, 2018

Related U.S. Application Data

(60) Provisional application No. 62/407,866, filed on Oct. 13, 2016.

(51) Int. Cl.
*G06F 1/26* (2006.01)
*G06F 1/20* (2006.01)

(52) U.S. Cl.
CPC ............... *G06F 1/26* (2013.01); *G06F 1/203* (2013.01)

(58) Field of Classification Search
CPC .......... G06F 1/26; G06F 1/1632; G06F 1/203
See application file for complete search history.

(56) References Cited

U.S. PATENT DOCUMENTS 5,455,466 A 10/1995 Parks et al.
5,673,173 A 9/1997 Tsai
5,768,100 A 6/1998 Barrus et al.
5,786,984 A 7/1998 Bonardi et al.
(Continued)

FOREIGN PATENT DOCUMENTS

CN 202817828 U 3/2013
WO 2015075713 A1 5/2015

OTHER PUBLICATIONS

Y.N, et al. "Wireless Electricity Transmission Based on Electromagnetic and Resonance Magnetic Coupling", http://www.ijceronline.com/papers/Vol2_issue7/K027048051.pdf, Published Nov. 2012 in International Journal of Computational Engineering Research, vol. 2, Issue 7, 4 pages.
(Continued)

*Primary Examiner* — Hoa C Nguyen
*Assistant Examiner* — Keith DePew
(74) *Attorney, Agent, or Firm* — Holzer Patel Drennan (57) ABSTRACT

Computing device manufacturers are often driven to minimize power supply capabilities supplied with a device to that required to operate the device. The disclosed computing devices include a system chassis and a removable power module. The removable power module includes a power supply that rectifies received AC power to a quantity of DC power sufficient to operate both the removable power module and the system chassis. The removable power module may also include a performance enhancing component that may be used to upgrade the performance of the device. As each removable power module includes the power supply for the entire device, the power supply within each removable power module may be tailored to provide the power necessary to operate both the removable power module and the system chassis.

18 Claims, 9 Drawing Sheets

(56) References Cited

U.S. PATENT DOCUMENTS

| | | | | |
|---|---|---|---|---|
| 5,880,932 | A * | 3/1999 | Jelinger | G06F 1/26 307/150 |
| 6,009,492 | A | 12/1999 | Matsuoka | |
| 6,018,456 | A * | 1/2000 | Young | G06F 1/181 361/679.4 |
| 6,038,126 | A * | 3/2000 | Weng | G06F 1/189 312/223.2 |
| 6,466,433 | B1 * | 10/2002 | Diaz | G06F 1/181 292/148 |
| 6,469,742 | B1 | 10/2002 | Trovato et al. | |
| 6,998,821 | B2 * | 2/2006 | Sakai | H02J 9/061 320/138 |
| 7,133,293 | B2 * | 11/2006 | Fiorentino | G06F 1/184 361/752 |
| 7,239,509 | B1 | 7/2007 | Roeske | |
| 7,280,366 | B1 * | 10/2007 | Hendrix | G06F 1/181 312/223.2 |
| 7,372,465 | B1 | 5/2008 | Tamasi et al. | |
| 7,379,305 | B2 * | 5/2008 | Briggs | G06F 1/181 361/727 |
| 7,948,208 | B2 | 5/2011 | Partovi et al. | |
| 7,952,322 | B2 | 5/2011 | Partovi et al. | |
| 8,088,014 | B2 | 1/2012 | Wells | |
| 8,125,487 | B2 | 2/2012 | Bakalash et al. | |
| 8,228,025 | B2 | 7/2012 | Ho et al. | |
| 8,446,417 | B2 | 5/2013 | Diamond | |
| 8,466,583 | B2 | 6/2013 | Karalis et al. | |
| 8,472,436 | B2 | 6/2013 | Meiri et al. | |
| 8,924,609 | B2 | 12/2014 | Fowler | |
| 9,275,430 | B2 | 3/2016 | Bakalash | |
| 9,415,309 | B2 | 8/2016 | Bentdahl | |
| 9,450,363 | B2 | 9/2016 | Ghosh et al. | |
| 2003/0046452 | A1 * | 3/2003 | Andrewartha | G06F 1/181 710/2 |
| 2003/0067744 | A1 | 4/2003 | Pappalardo et al. | |
| 2004/0000815 | A1 * | 1/2004 | Pereira | G06F 1/189 307/11 |
| 2004/0032716 | A1 * | 2/2004 | Roan | G06F 1/18 361/679.48 |
| 2004/0184242 | A1 | 9/2004 | Jones et al. | |
| 2005/0190536 | A1 | 9/2005 | Anderson et al. | |
| 2006/0061976 | A1 * | 3/2006 | Belson | G06F 1/26 361/760 |
| 2006/0087872 | A1 * | 4/2006 | Barsun | G06F 1/26 363/146 |
| 2006/0146492 | A1 | 7/2006 | Reents et al. | |
| 2007/0083298 | A1 | 4/2007 | Pierce et al. | |
| 2007/0087830 | A1 | 4/2007 | Varma et al. | |
| 2008/0116847 | A1 | 5/2008 | Loke et al. | |
| 2008/0182656 | A1 | 7/2008 | Crowder, Jr. | |
| 2010/0130278 | A1 | 5/2010 | Shimabukuro et al. | |
| 2012/0159090 | A1 | 6/2012 | Andrews et al. | |
| 2012/0166014 | A1 * | 6/2012 | Garaschenko | G05D 23/1919 700/300 |
| 2013/0198532 | A1 * | 8/2013 | Bailey | G06F 1/26 713/300 |
| 2014/0124468 | A1 | 5/2014 | Lundrigan et al. | |
| 2014/0204525 | A1 * | 7/2014 | Pecone | H05K 13/00 361/679.33 |
| 2015/0026376 | A1 | 1/2015 | Scanlan et al. | |
| 2015/0263537 | A1 * | 9/2015 | Azancot | H01F 38/14 307/104 |
| 2015/0343306 | A1 | 12/2015 | Bentdahl | |
| 2016/0149426 | A1 | 5/2016 | Hodges et al. | |

OTHER PUBLICATIONS

Piston Console, http://www.xi3.com/piston, Published on: Nov. 8, 2013, 5 pages.

P9X79 _ Motherboards _ ASUS India, https://www.asus.com/in/Motherboards/P9X79/, Published on: Aug. 7, 2013, 5 pages.

Moore Bo, "Give Us a Modular Console We Can Upgrade Like Google's New Phone", https://www.wired.com/2014/04/project-ara-gaming/, Published on: Apr. 21, 2014, 3 pages.

Evangelho, Jason, "Nyko's PS4 Modular Charging Station Looks Like the Cure for Your Ailing DualShock 4 Controllers", http://www.forbes.com/sites/jasonevangelho/2014/10/16/nykos-ps4-modular-charging-station-looks-like-the-cure-for-your-ailing-dualshock-4-controllers/, Published on: Oct. 16, 2014, 4 pages.

How to Add an External Hard Disk to Your Xbox, PS3, or PS4, http://gadgets.ndtv.com/games/features/how-to-add-an-external-hdd-to-your-game-console-646264, Published on: Jan. 9, 2015, 5 pages.

Hill Brandon, "Microsoft Files Patent for Upgradable, Modular Surface All-in-One PC System", http://hothardware.com/news/microsofts-modular-surface-pc-concept-detailed-in-patent, Published on: Feb. 15, 2016, 4 pages.

Steven Bogos, "Microsoft Wants Xbox to be Upgradable Like a PC", http://www.escapistmagazine.com/forums/read/7.935315-Microsoft-Wants-Xbox-to-be-Upgradable-Like-a-PC, Published on: Mar. 2, 2016, 2 pages.

James O'Malley, "Played right, Xbox One's upgrade plan could win it the console war", http://www.in.techradar.com/news/gaming/consoles/Played-right-Xbox-Ones-upgrade-plan-could-win-it-the-console-war/articleshow/51247305.cms, Published on: Mar. 3, 2016, 21 pages.

Patterson, Dan, "How to build an external GPU for 4K video editing, VR, and gaming", http://www.techrepublic.com/article/how-to-build-an-external-gpu-for-4k-video-editing-vr-and-gaming/, Published on: Apr. 14, 2016, 8 pages.

Villegas, Tomas, "Apple MacBook Pro with an External Graphics Card!?", https://www.youtube.com/watch?v=62z9Af3HoXg, Published on: Jun. 18, 2016, 1 pages.

Gigabyte GP-T3GFx Intel Thunderbolt 3 External Graphics Enclosure (eGPU) with Daisy Chain, https://www.youtube.com/watch?v=IHPiqdcZCec, Published on: Jun. 20, 2016, 1 pages.

Dell E-Port Replicator Docking Station with USB 3.0, https://www.walmart.com/ip/Dell-E-Port-Replicator-Docking-Station-with-USB-3.0/46100637, Retrieved on: Jan. 23, 2017, 7 pages.

32X, https://en.wikipedia.org/wiki/32X, Retrieved on: Feb. 27, 2017, 10 pages.

"Non Final Office Action Issued in U.S. Appl. No. 15/443,996", dated Oct. 5, 2018, 8 Pages.

* cited by examiner

COMPUTING DEVICE WITH REMOVABLE POWER MODULE

CROSS-REFERENCE TO RELATED APPLICATIONS

The present application claims benefit of priority to U.S. Provisional Patent Application No. 62/407,866, entitled "User Upgradable Gaming Console" and filed on 13 Oct. 2016, which is specifically incorporated by reference herein for all that it discloses or teaches.

BACKGROUND

Computing devices encompass a variety of devices that that can be programmed to carry out one or more specific sets of arithmetic and/or logical operations, with or without user input. In the face of advancing technology, a computing device that was state of the art when purchased by a consumer can quickly become obsolete. While some computing devices permit the consumer to selectively upgrade specific components, such upgrades often require specific technical knowledge to be performed safely and successfully. Thus, most computing devices are discarded rather than upgraded when they become obsolete.

SUMMARY

Implementations described and claimed herein address the foregoing and following problems by providing a computing device comprising a system chassis and a removable power module. The system chassis includes a base system board to provide computing functionality to the computing device and a module dock. The removable power module includes an external power connector to receive AC power into the removable module, a power supply to rectify the received AC power to DC power to operate the removable powered module and the system chassis, and a selective power connector to the base system board via the module dock.

Implementations described and claimed herein further address the foregoing and following problems by further providing a method of powering a computing device. The method includes docking a removable power module within a module dock of a system chassis, receiving AC power from an external power connector to the removable power module, rectifying the AC power to DC power within the removable power module, and transferring DC power from the removable powered module to the system chassis via a selective power connector to a base system board within the system chassis.

Implementations described and claimed herein still further address the foregoing and following problems by still further providing a computing device comprising a system chassis and a removable power module. The system chassis includes a base system board to provide computing functionality to the computing device and a module dock. The removable power module includes an external power connector to receive AC power into the removable power module, a power supply to rectify the received AC power to DC power to operate the removable power module and the system chassis, a selective power connector to the base system board via the module dock, a power module board incorporating a performance enhancing component, and a selective data connector between the base system board and the power module board via the module dock.

Other implementations are also described and recited herein. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A video game console is a specific type of computing device that accepts user inputs and outputs an audio/video signal so that one or more users may play a video game. Consumers are often faced with many console offerings, including multiple offerings from a single manufacturer. Thus, a consumer may have a great deal of confusion and uncertainty with making a console purchase decision. The consumer may end up waiting for the next console release rather than purchasing a new console. Further, consumers are often frustrated and apprehensive regarding rapid console releases. For example, consumers may question whether a new release will be backward compatible with previously purchased games.

Video game consoles traditionally do not offer the consumer an opportunity to upgrade specific components of the console. Further, in minimizing cost, console manufacturers are driven to minimize power supply capabilities supplied with a console to that required to operate the console. Thus, a power supply provided as an integral part of the console may be insufficient to power an intended upgrade to the console. As a result, like other computing devices, most consoles are discarded rather than upgraded when they become obsolete. However, consumers may balk at spending several hundred dollars to replace obsolete consoles on a regular basis. The computing devices with removable power modules described in detail herein are intended to address some or all of the foregoing problems, as well as other problems not specifically identified herein.

Figure 1:
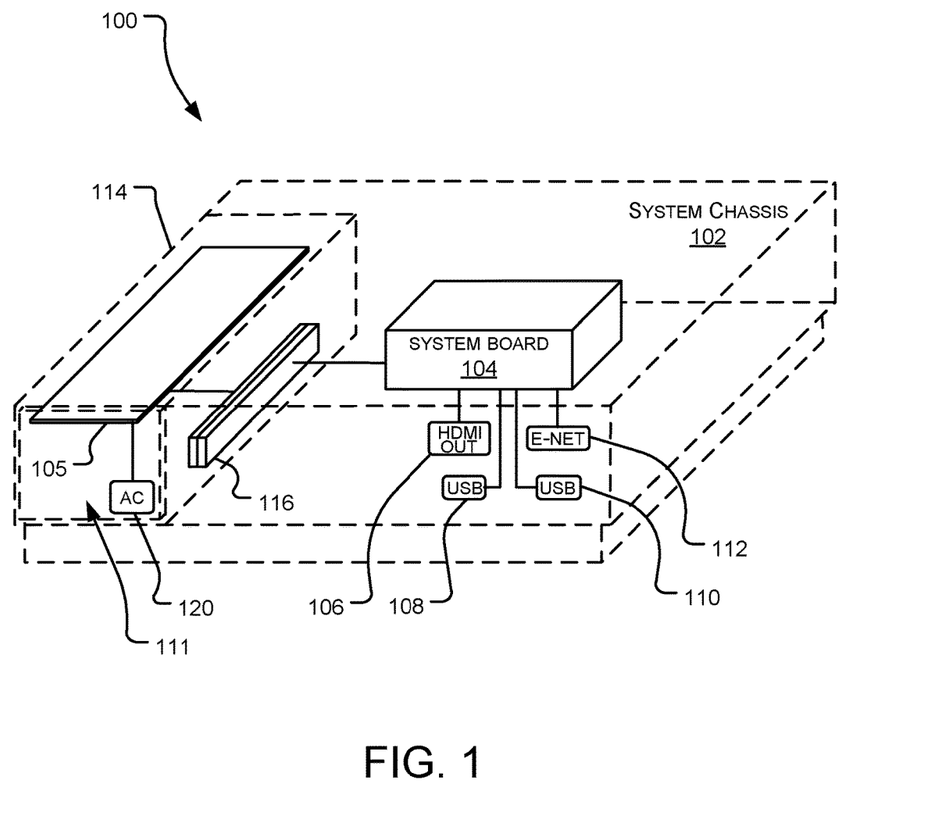
FIG. 1 illustrates an example computing device with a base removable power module.

FIG. 1 illustrates an example computing device 100 with a base removable power module 114. The computing device 100 includes a system chassis 102 that provides a physical platform for mounting and encompassing various components of the computing device 100. The power module 114 selectively physically interfaces with and attaches to the system chassis 102 by inserting or sliding into a module or expansion dock 111 (e.g., an aperture or slot) in the system chassis 102, and snapping or rotating in place to physically secure the power module 114 to the system chassis 102. Further, power and I/O (or data) connections between a power supply 105 and a system board 104 within the computing device 100 may be automatically made when the user physically interfaces the power module 114 to the system chassis 102.

The system board 104 may include a central processing unit (CPU), memory, a power connector, and various input/output connectors to additional components of the computing device 100. An operating system, such as one of the varieties of the Microsoft Windows® operating system, may reside in the memory and is executed by the central processing unit, although other operating systems may be employed by the computing device 100. In various implementations, the system board 104 may also include a graphics processing unit (GPU), secondary memory (e.g., flash or optical storage), heat dissipation fans and/or sinks, and/or a backup battery.

The various input/output connectors of the system board 104 may include the depicted HDMI 106, USB 108, USB 110, and Ethernet 112, as well as a subset of the depicted connectors and/or additional connectors with preselected physical forms and operating over preselected communication standards (e.g., component A/V, optical audio, and infrared (IR) receiver, transmitter, or transceiver). The various input/output connectors of the system board 104 may permit the computing device 100 to be connected to a variety of peripheral devices (e.g., a television, a computer display, a game controller, a keyboard, and a mouse) and/or provide network connectivity. The system chassis 102 may also include one or more communication transceivers to provide wireless network connectivity (e.g., a mobile phone network, Wi-Fi®, and Bluetooth®) or a positioning system (e.g., a global positioning satellite transceiver). Still further, the system chassis 102 may also include one or more cameras or motion sensors, one or more audio interfaces (e.g., a microphone, an audio amplifier, a speaker, and an audio jack), one or more antennas, and additional storage. Other configurations may also be employed.

The power supply 105 receives high-voltage AC power (e.g., 110/120V AC, or greater) via an external power connector 120 on the power module 114. The power supply 105 converts (or rectifies) the high-voltage AC power to low voltage DC power (e.g., 12V DC, or lower) that is consumed by the computing device 100. More specifically, the power supply 105 is sized to provide sufficient power to operate the power module 114, the system board 104, and all other power-consuming components of the computing device 100 with little to no excess power capacity (e.g., less than 5% greater than a peak expected power demand). The system chassis 102 does not incorporate a separate AC-DC power supply, but instead consumes power provided by the power module 114.

The system board 104 is connected to power module 114 via a connector 116. The connector 116 (e.g., a peripheral component interconnect express (PCIe or PCI-E) connector) provides both input/output and power connectivity between the system board 104 and the power module 114. In other implementations, there are multiple connectors (e.g., at least one power connector and at least one input/output connector) between the system chassis 102 and the power module 114. In some implementations, the connector 116 is a first half of an inductive coupling, which inductively transfers power to a second half of the inductive coupling when placed in close physical proximity with the second half of the inductive coupling. By converting the high voltage AC power to low voltage DC power within the power module 114, a user is not exposed to any high voltage connections at the connector 116, which can be a safety benefit.

As the system chassis 102 lacks its own dedicated power supply, the power module 114 is required for the computing device 100 to operate. In some implementations, the power module 114 is considered a base module intended only to provide the minimum equipment required for the computing device 100 to operate. In many instances, the power module 114 is provided with the computing device 100 to a user upon purchase. In other implementations, the power module 114 provides additional performance features (e.g., CPU power, GPU power, memory, data storage, audio and/or video upgrades, and additional physical connectors) to the system chassis 102 and the associated system board 104. In various implementations, the computing device 100 is a gaming device, smart phone, tablet computer, laptop computer, personal computer, or any other discrete device that carries out one or more specific sets of arithmetic and/or logical operations.

Figure 2:
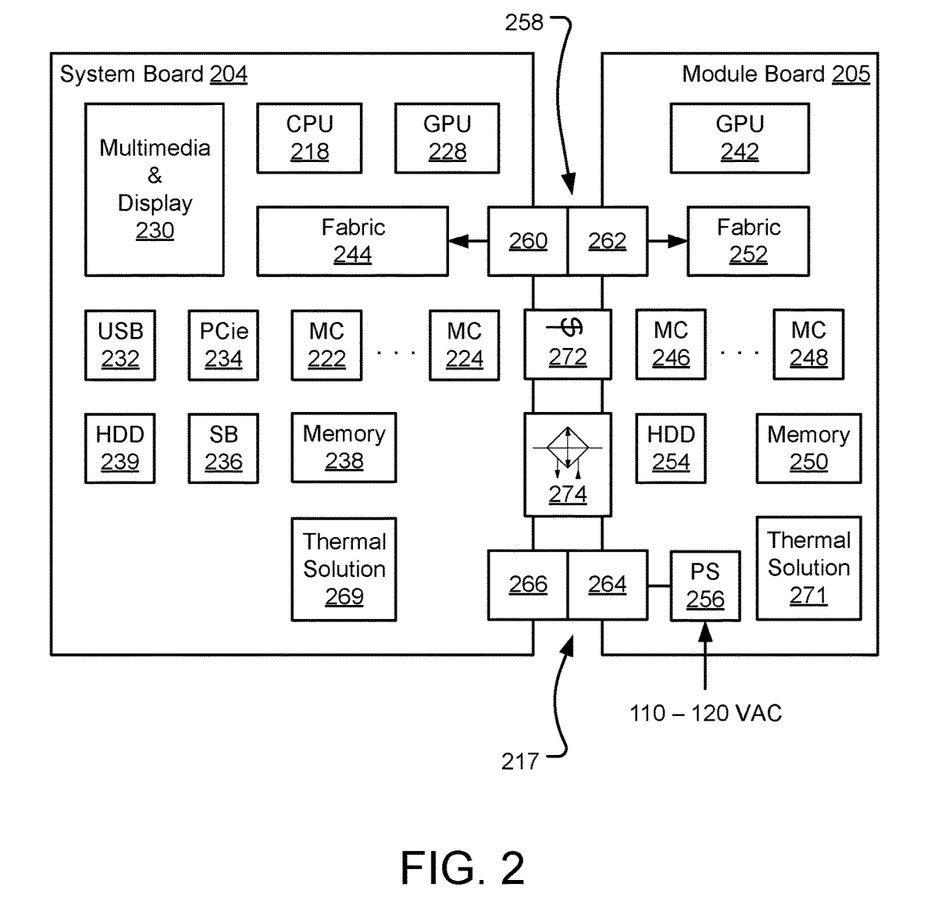
FIG. 2 illustrates an example system diagram for a system board and a removable performance power module board.

FIG. 2 illustrates an example system diagram for a system board 204 and a removable performance power module board 205. The system board 204 is contained within a system chassis (not shown, see e.g., system chassis 102 of FIG. 1) and includes a central processing unit (CPU) 218 (e.g., discrete or integrated microelectronic chips and/or separate but integrated processor cores), a graphics processing unit (GPU) 228, a series of memory controllers (e.g., memory controllers 222, 224), and various external interfaces to additional components of a computing device (not shown, see e.g., computing device 100 of FIG. 1). The external interfaces may include, for example, multimedia and display interface 230, USB interface 232, and PCIe interface 234.

The system board 204 also includes a southbridge 236, which provides connectivity to a variety of external ports (not shown, see e.g., ports 106, 108, 110, 112 of FIG. 1) and/or additional connectors with preselected physical forms and operating over preselected communication standards. The various input/output connectors of the system board 204 may permit the computing device to be connected to a variety of peripheral devices (e.g., a television, a computer display, a game controller, a keyboard, and a mouse).

The system board 204 further includes memory 238 that may include one or both of volatile memory (e.g., RAM and DDR) and non-volatile memory (e.g., eMMC and flash memory). An operating system, such as one of the varieties of the Microsoft Windows® operating system, may reside in the memory 238 and is executed by the central processing unit 218, although other operating systems may be employed by the computing device. Still further, the system board 204 includes a hard disk drive 239 (or other non-volatile storage media) that provides data storage to the system board 204.

Additional or fewer features may be incorporated within the system board 204. In various implementations, some or all of the aforementioned components are concentrated within a system-on-chip (SOC) on the system board 204. Finally, the various components of the system board 204 are interconnected via fabric 244.

Figure 3:
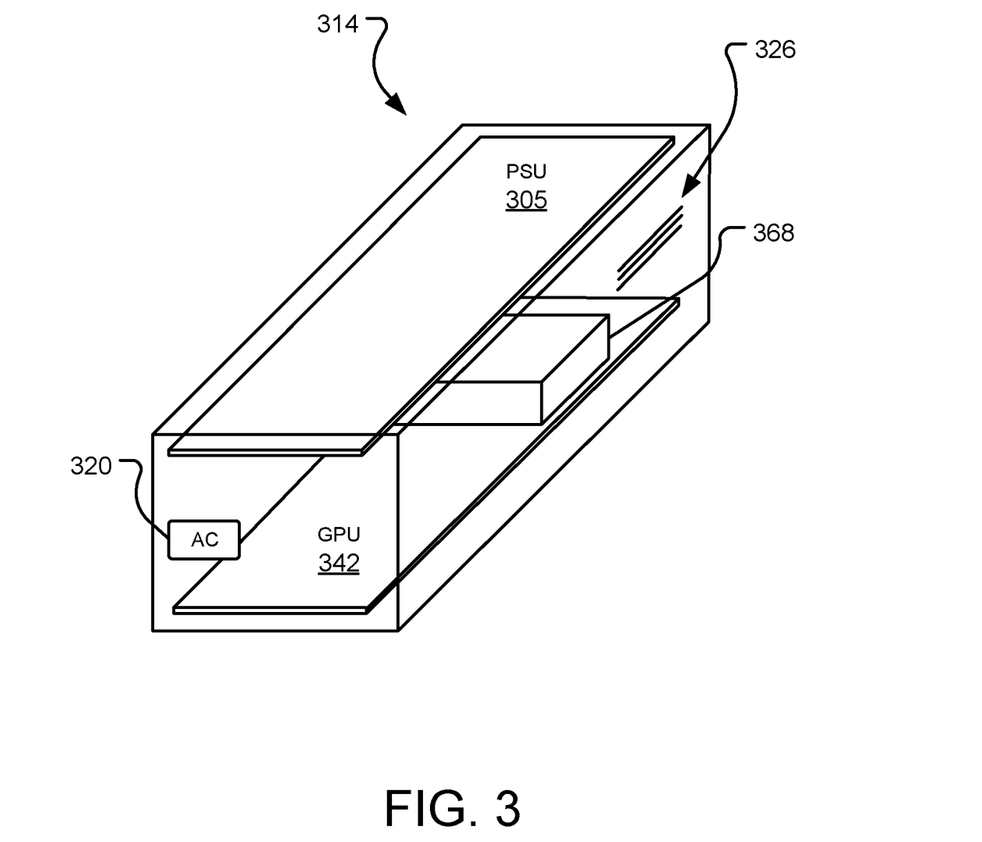
FIG. 3 illustrates an example graphics performance removable power module for a computing device.

Module board 205 is contained within a removable performance power module (not shown, see e.g., graphics performance removable power module 314 of FIG. 3) and includes performance enhancing components, as well as a power supply 256 to accommodate the entire computing device. For example, the module board 205 may include an additional graphics processing unit 242 and an additional series of memory controllers (e.g., memory controllers 246, 248). The module board 205 may further include additional graphics memory 250 (e.g., high-bandwidth memory). Finally, the various components of the module board 205 are interconnected via fabric 252.

When the module board 205 is used in conjunction with the system board 204, the additional graphics processing unit 242 may be operated in addition to or in lieu of the graphics processing unit 228 of the system board 204. The module board 205 may also include a hard disk drive 254 (or other non-volatile storage media) that provides additional data storage. In some implementations, a controller for the hard disk drive 254 is located on the system board 204 or the module board 205. In various implementations, some or all of the aforementioned components are concentrated within a system-on-chip (SOC) on the module board 205. Additional or fewer features than those described above may be incorporated within the module board 205.

A variety of module boards with different capabilities may be available for a user to select from based on the user's needs. For example, other module boards may incorporate an additional CPU, or omit the GPU 242, memory 250, or HDD 254 from the module board 205. Still further, while other module boards may have similar components as the module board 205, the individual components within the other module boards may have differing performance features (e.g., a higher or lower speed CPU or GPU, more or less total memory, or more or less storage capacity).

The power supply 256 receives externally supplied high-voltage AC power via an external power connector (not shown, see e.g., external power connector 120 of FIG. 1) and converts the AC power to low-voltage DC power that is consumed by the module board 205, system board 204, and other power-consuming components of the computing device. The power supply 256 is sized to provide sufficient power to operate all power-consuming components of the computing device with little to no excess power capacity. Selective power connector 217 is a is a two-part physical connector with a first part 264 connected to power supply 256 on the module board 205 and a second part connected to the system board 204 and other power-consuming components within the system chassis. When the two parts 264, 266 are connected, the selective power connector 217 conducts DC power from the performance power module to power-consuming components within the system chassis.

In various implementations, the power supply 256 is included as a component of the module board 205, as shown. In other implementations, the power supply 256 is a component within the power module separate from the module board 205. In some implementation of a base power module, the module board 205 and the power supply 256 are one in the same.

The system board 204 fabric 244 is connected to the module board 205 fabric 252 via a selective high-speed communication and data connector 258 (e.g., a PCIe connection). The high-speed data connection provides input/output connectivity between the system board 204 and the module board 205. FIG. 2 illustrates the high-speed data connection 258 as a two-part physical connector with a first part 260 residing on a system chassis and connected to the system board 204 and a second part 262 residing on the removable performance power module and connected to the module board 205. The high-speed data connection 258 is created when the first and second parts 260, 262 are physically connected. In other implementations, the high-speed data connection 258 may exist in whole or in part wirelessly. In some implementations, the selective power connector 217 and the selective data connector 258 are combined in one physical connector between the performance power module and the system chassis (see e.g., connector 116 of FIG. 1.

The system board 204 may also incorporate a system thermal solution 269 that dissipates or otherwise transfers thermal energy away from the system board 204. In various implementations, the system thermal solution 269 includes one or more of cooling fans, vents, and heat sinks. The module board 205 may also incorporate a module thermal solution 271 that dissipates or otherwise transfers thermal energy away from the module board 205. In various implementations, the module thermal solution 271 also includes one or more of cooling fans, vents, and heat sinks, which may be different from the system thermal solution 269.

The module thermal solution 271 may operate dependent upon the system thermal solution 269, independent from the system thermal solution 269, or complementary to the system thermal solution 269. In an example implementation where the module thermal solution 271 is dependent upon the system thermal solution 269, the module thermal solution 271 includes inlet and/or outlet vents and a cooling fan included within the system thermal solution 269 draws air through the vents or pushes air out of the vents to cool both the system board 204 and the module board 205. In an example implementation where the module thermal solution 271 is independent from the system thermal solution 269, the module thermal solution 271 includes both a cooling fan and vents to cool the module board 205 and that operate independently of the system thermal solution 269, which cools the system board 204.

In an example implementation where the module thermal solution 271 complements the system thermal solution 269, the module thermal solution 271 includes a cooling fan and vents that add to the capacity of another fan and vents included within the system thermal solution 269. The fans and vents included within each of the system thermal solution 269 and the module thermal solution 271 operate in unison to collectively cool both the system board 204 and the module board 205. In various implementations, different module boards may incorporate different thermal solutions that may be dependent upon, independent from, or complementary to the system thermal solution 269.

The programming model and basic architecture may be shared between the CPU 218, GPU 228, and GPU 242 so that the module board 205 performance adds to rather than replaces the system board 204 performance. In addition, the memory 238 and memory 250 may share virtual address space so that the CPU 218, GPU 228, and GPU 242 can view the memory 238 and the memory 250 as a single memory store. The HDD 239 and the HDD 254 may also be similarly addressed so that the CPU 218, GPU 228, and GPU 242 can view the HDD 239 and the HDD 254 as a single combined data storage.

In some implementations, the high-speed data connection operates in a cache coherent manner. More specifically, each of the CPU 218, GPU 228, and GPU 242 has access to one or more caches associated with the memory 238 and the memory 250. A cache coherence protocol is enforced which ensures that changes in the values of shared operands within the cache(s) are propagated throughout the fabric 244 and fabric 252 in a timely fashion.

Further, the high-speed data connection may incorporate a data security protocol (e.g., data encryption) to prevent unauthorized monitoring or tampering with data passing between the system board 204 and the module board 205. In one example implementation, the module board 205 exchanges a predetermined key over the connection fabric 244, 252, which is then validated as authentic by the system CPU 218 by comparing it to a matching key stored within the memory 238 or on the HDD 239 of the system board 204. This key is also encrypted and stored within the memory 250 or on the HDD 254 of the module board 205. In another example implantation, a pair of security chips are included on each of the system board 204 and the module board 205, which then facilitates authentication upon connection of the module board 205 to the system board 204. The chips verify that authentication has succeeded with the CPU 218 via an encrypted communication protocol.

Connection of the selective power connector 217 and/or the selective data connector 258 between the system chassis and the performance power module may be preconditioned on closing switch 272 or performing a security authentication between the system chassis and the performance power module. The switch 272 ensures that the performance power module is properly mounted to or within an expansion dock (not shown, see e.g., expansion dock 111 of FIG. 1) of the system chassis prior to making the communication, data, and/or power connections. This preconditioning may be for safety reasons (e.g., by not permitting a user to access the selective power connector 217). For example, the selective power connector 217 may have a physical shield that is automatically retracted when the switch 272 is closed. For further example, the selective power connector 217 may only be supplied power when the switch 272 is closed. This preconditioning may also be for functionality reasons. For example, closing the switch 272 may signal to the system board 204 to attempt communication, data, and/or power connections with the module board 205. Similarly, opening the switch 272 may signal to the system board 204 to cease communication, data, and/or power connections with the module board 205.

The switch 272 may take a variety of physical forms and incorporate a variety of technologies adapted to detect the presence of the performance power module within the module dock (e.g., mechanical, capacitive, Doppler sensor, eddy-current, inductive, laser sensor, magnetic sensor, optical sensor, infrared sensor, photocell, radar, sonar, and hall effect). The switch 272 may also include a physical or magnetic seat that ensures that the performance power module is properly aligned and installed within the expansion dock in the system chassis. In other implementations, the switch 272 and/or the seat is omitted.

A shared heat exchanger 274 may conduct thermal energy away from both the system board 204 and associated system chassis and the module board 205 and associated performance power module. The heat exchanger 274 may incorporate a variety of thermal solutions (e.g., convective fans, conductive plates, and liquid-cooled heat exchangers). In other implementations, the system chassis and the performance power module each have their own thermal solutions in addition to or in lieu of the shared heat exchanger 274.

In various implementations, the performance enhancing components of the performance power module (e.g., connectors or ports, graphics processing, computing power, and data storage) may be combined into a single performance power module or different combinations of features may be combined in different performance power modules. Further, the computing device may physically accommodate more than the depicted one performance power module. That way, a user may select several performance power modules possessing features best suited to the user's needs.

FIG. 3 illustrates an example graphics performance removable power module 314 for a computing device. The power module 314 selectively physically interfaces with a system chassis (not shown, see e.g., system chassis 102 of FIG. 1) of the computing device by inserting or sliding it into a receiver (e.g., an aperture or slot) in the system chassis, and snapping or rotating it in place to physically secure the power module 314 to the system chassis. Further, power and I/O (or data) connections between the power module 314 and a system board (not shown, see e.g., system board 104 of FIG. 1) within the computing device may be automatically made when the user physically interfaces the power module 314 with the system chassis. For ease of use, other power modules may be selectively physically and communicatively interfaced with the system chassis in a similar manner as that described with regard to the power module 314.

The power module 314 is intended to provide the functionality of a base power module (e.g., power module 114 of FIG. 1), while also providing additional graphics performance to the computing device as compared to a computing device operating with a base power module. To that end, the power module 314 includes a graphic processing unit (GPU) 342, which supplements or supersedes a standard graphic processing unit included on a system board of the computing device. In some implementations, the graphic processing unit 342 may include dedicated volatile memory. The power module 314 also includes a power supply unit (PSU) 305 that converts high voltage AC power supplied from a common AC power source via an external power connector 320 to low voltage DC power that is consumed by the computing device. The power supply 305 is sized to provide sufficient power to operate the power module 314 and all other power-consuming components of the computing device, which may be substantially more power than that supplied by a base power module.

The graphic processing unit 342 generates additional thermal energy within the power module 314 (as compared to a base module) and consumes additional power, which necessitates a relatively larger power supply 305, which in turn also generates additional thermal energy within the power module 314. To maintain acceptable thermal operating conditions within the power module 314, the power module 314 may incorporate a cooling fan 368 to convectively cool the components within the power module 314 by directing air through the power module 314. In various implementations, the cooling fan 368 may direct cooling air through the base power module as well to provide additional cooling capacity to the base module.

The power module 314 may also include vents (e.g., vents 326) on two or more exterior surfaces of the power module 314 to serve as inlets and/or outlets for air moving through the power module 314. In one example implementation, a cooling fan in the base module (not shown) draws air through the vents 326 and exhausts the air out of the base unit to cool both the power module 314 and the base unit, or vice versa. This implementation is referred to herein as a dependent thermal solution.

In another example implementation, the power module 314 includes its own thermal solution separate from a thermal solution of the base module. More specifically, the vents 326 are located on a side of the power module 314 and a second set of vents (not shown) are located on a front or rear of the power module 314 in order to use the cooling fan 368 to draw cooling air into the side of the power module 314 and exhaust out the front or rear of the power module 314, or vice versa. This implementation is referred to herein as an independent thermal solution.

In yet another implementation, the cooling fan 368 and vents 326 add to the capacity of an existing fan and vents on the base module by providing additional cooling airflow and/or air paths that complement a thermal solution specific to the base module. This implementation is referred to herein as a complementary thermal solution. In various implementations, the vents 326 may either be fixed in an open orientation or be selectively closed based on thermal conditions of the power module 314 and/or the base module. Generally, the power module 314 may utilize cooling capability included within the system chassis in addition to or in lieu of the dedicated cooling systems described above. Further still, the power module 314 (or other modules) may conductively transfer heat to the system chassis, where it is dissipated.

Figure 4:
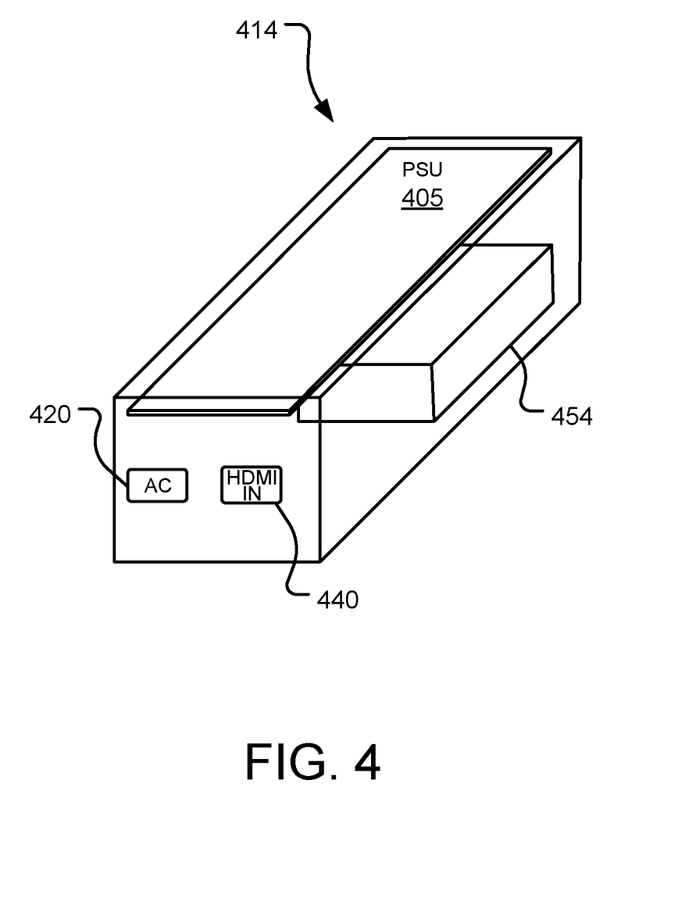
FIG. 4 illustrates an example digital video recording removable power module for a computing device.

FIG. 4 illustrates an example digital video recording (DVR) removable power module 414 for a computing device. The power module 414 selectively physically interfaces with a system chassis (not shown, see e.g., system chassis 102 of FIG. 1) of the computing device as described in detail above. Further, power and I/O (or data) connections between the power module 414 and a system board (not shown, see e.g., system board 104 of FIG. 1) within the computing device are as described in detail above.

The DVR power module 414 is intended to provide the functionality of a base module, while also adding digital video recording capability to the computing device. To that end, the DVR power module 414 includes a hard disk drive 454 (or other non-volatile storage media) for storing recorded content and an HDMI input connector 440 so that an A/V stream may be input to the DVR power module 414 and potentially recorded on the hard disk drive 454.

The DVR power module 414 also includes a power supply unit (PSU) 405 that converts high voltage AC power supplied from a common AC power source via an external power connector 420 to low voltage DC power that is consumed by the computing device. The power supply 405 is sized to provide sufficient power to operate the DVR power module 414 and all other power-consuming components of the computing device, which may be substantially more power than that supplied by a base power module.

Figure 5:
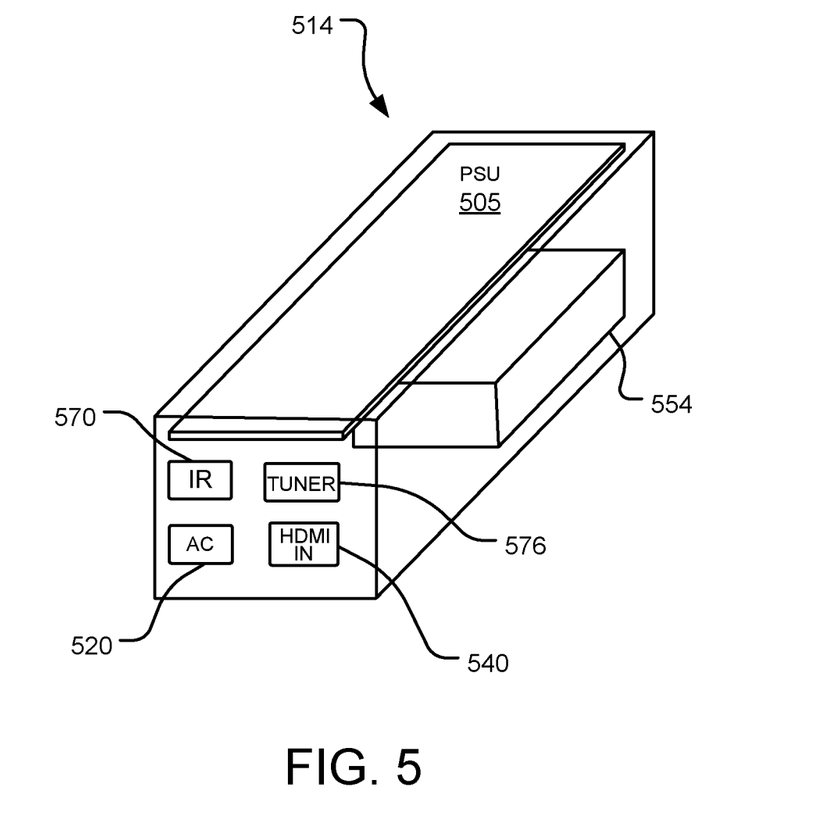
FIG. 5 illustrates an example digital video recording removable power module with nested modularity for a computing device.

FIG. 5 illustrates an example digital video recording (DVR) removable power module 514 with nested modularity for a computing device. The power module 514 selectively physically interfaces with a system chassis (not shown, see e.g., system chassis 102 of FIG. 1) of the computing device as described in detail above. Further, power and I/O (or data) connections between the power module 514 and a system board (not shown, see e.g., system board 104 of FIG. 1) within the computing device are as described in detail above.

The DVR power module 514 is intended to provide the functionality of a base power module, while also adding digital video recording capability and optional additional I/O connections to the computing device. To that end, the DVR power module 514 includes a hard disk drive 554 (or other non-volatile storage media) for storing recorded content. The DVR power module 514 may also include an HDMI input connector 540 so that an A/V stream may be input to the DVR power module 514 and potentially recorded on the hard disk drive 554. The DVR power module 514 may still further include an IR connector 570 and/or tuner connector 576, which can be considered sub-modules that are potentially separate from the power module 514 and selectively plugged into the DVR power module 514 as desired by the user (referred to herein as nested modularity).

The DVR power module 514 also includes a power supply unit (PSU) 505 that converts high voltage AC power supplied from a common AC power source via an external power connector 520 to low voltage DC power that is consumed by the computing device. The power supply 505 is sized to provide sufficient power to operate the DVR power module 514 and all other power-consuming components of the computing device, which may be substantially more power than that supplied by a base power module.

Figure 6:
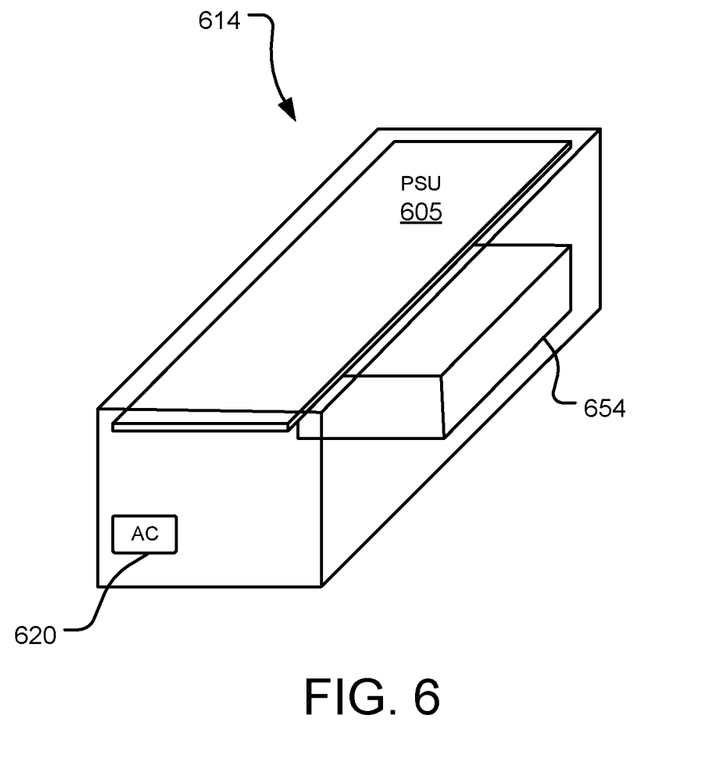
FIG. 6 illustrates an example storage upgrade removable power module for a computing device.

FIG. 6 illustrates an example storage upgrade removable power module 614 for a computing device. The power module 614 selectively physically interfaces with a system chassis (not shown, see e.g., system chassis 102 of FIG. 1) of the computing device as described in detail above. Further, power and I/O (or data) connections between the power module 614 and a system board (not shown, see e.g., system board 104 of FIG. 1) within the computing device are as described in detail above.

The storage upgrade removable power module 614 is intended to provide the functionality of a base power module, while also adding data storage capability to the computing device. To that end, the power module 614 includes a hard disk drive 654 (or other non-volatile storage media) for storing data.

The storage upgrade removable power module 614 also includes a power supply unit (PSU) 605 that converts high voltage AC power supplied from a common AC power source via an external power connector 620 to low voltage DC power that is consumed by the computing device. The power supply 605 is sized to provide sufficient power to operate the power module 614 and all other power-consuming components of the computing device, which may be substantially more power than that supplied by a base power module.

Figure 7:
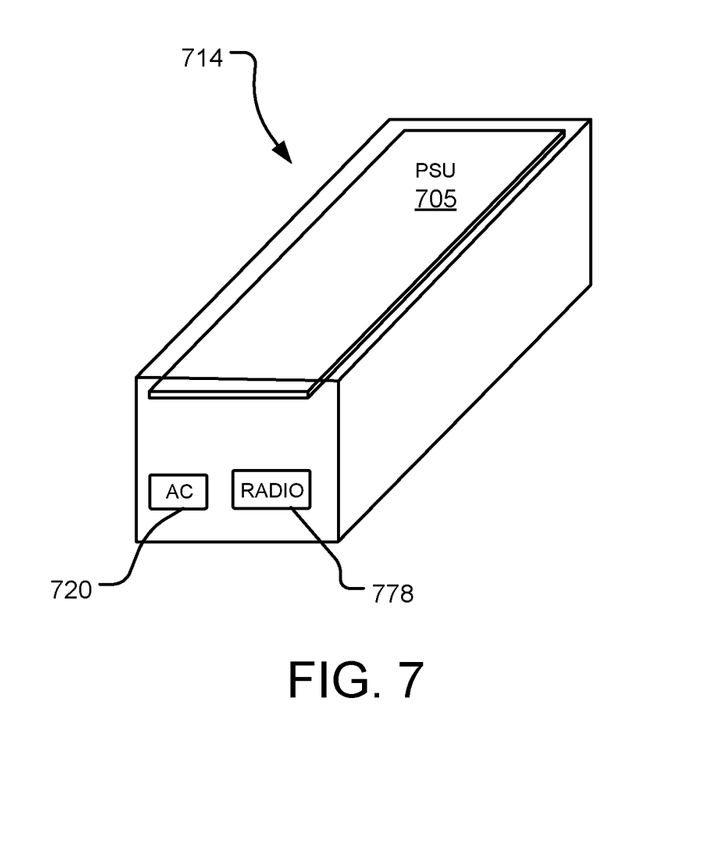
FIG. 7 illustrates an example home automation removable power module for a computing device.

FIG. 7 illustrates an example home automation removable power module 714 for a computing device. The power module 714 selectively physically interfaces with a system chassis (not shown, see e.g., system chassis 102 of FIG. 1) of the computing device as described in detail above. Further, power and I/O (or data) connections between the power module 714 and a system board (not shown, see e.g., system board 104 of FIG. 1) within the computing device are as described in detail above.

The home automation removable power module 714 is intended to provide the functionality of the base module, while also adding home automation features to the computing device. To that end, the power module 714 includes radio communication sub-module 778 that is potentially separate from the power module 714 and that communicates over a desired home automation standard (e.g., Z-wave, ZigBee, WeMo, and Thread). The user selects a desired sub-module 778 and selectively plugs it into the power module 714 (also referred to herein as nested modularity).

The home automation removable power module 714 also includes a power supply unit (PSU) 705 that converts high voltage AC power supplied from a common AC power source via an external power connector 720 to low voltage DC power that is consumed by the computing device. The power supply 705 is sized to provide sufficient power to operate the power module 714 and all other power-consuming components of the computing device, which may be substantially more power than that supplied by a base power module.

Figure 8:
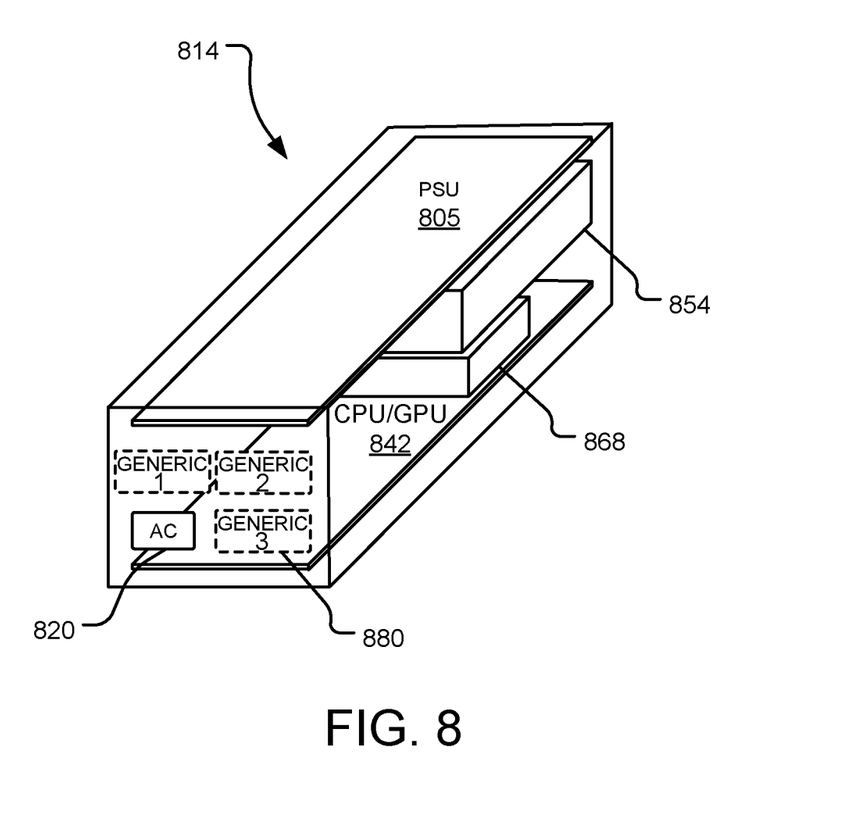
FIG. 8 illustrates an example comprehensive removable power module for a computing device.

FIG. 8 illustrates an example comprehensive removable power module 814 for a computing device. The power module 814 selectively physically interfaces with a system chassis (not shown, see e.g., system chassis 102 of FIG. 1) of the computing device as described in detail above. Further, power and I/O (or data) connections between the power module 814 and a system board (not shown, see e.g., system board 104 of FIG. 1) within the computing device are as described in detail above.

The comprehensive removable power module 814 is intended to provide the functionality of a base module, while adding many or all of the aforementioned features of the power modules of FIGS. 2-7. To that end, the power module 814 includes an upgraded processing unit 842 (GPU, CPU, or both), a hard disk drive 854 (or other non-volatile storage media), and generic ports (e.g., port 880). The generic ports can receive additional sub-modules that are potentially separate from the power module 814 (e.g., the additional sub-modules may be selectively plugged into the power module 814 via the generic ports as desired by the user, also referred to herein as nested modularity). Options for the sub-modules that may be selectively plugged into the generic ports include, but are not limited to, a home automation sub-module (e.g., communicating over a variety of available communication standards), a video sub-module (e.g., HDMI in, HDMI out, and display ports), an IR receiver, transmitter, or transceiver sub-module, a TV tuner sub-module, a wireless speaker sub-module (e.g., WiSA), and an open sub-module available to approved developers. More specifically, the open sub-module could have a published open standard so that approved developers may create different additional compatible sub-modules.

The comprehensive removable power module 814 also includes a power supply unit (PSU) 805 that converts high voltage AC power supplied from a common AC power source via an external power connector 820 to low voltage DC power that is consumed by the computing device. The power supply 805 is sized to provide sufficient power to operate the power module 814 and all other power-consuming components of the computing device, which may be substantially more power than that supplied by a base power module.

The comprehensive removable power module 814 generates additional thermal energy within the power module 814 (as compared to a base module) and consumes additional power, which necessitates a relatively larger power supply 805, which in turn also generates additional thermal energy within the power module 814. To maintain acceptable thermal operating conditions within the power module 814, the power module 814 may incorporate a cooling fan 868 to convectively cool the components within the power module 814 by directing air through the power module 814.

The power module 814 may also include vents (not shown, see e.g., vents 326 of FIG. 3) on two or more exterior surfaces of the power module 814 to serve as inlets and/or outlets for air moving through the power module 814. Further, the power module 814 may utilize cooling capability included within the system chassis in addition to or in lieu of the dedicated cooling systems described above. Further still, the power module 814 (or other modules) may conductively transfer heat to the system chassis, where it is dissipated.

In other implementations, other combinations of aforementioned power module features (e.g., connectors or ports, cooling capability, graphics processing, data storage, and wired or wireless networking connectivity or capability) and/or additional performance features may be combined into a single upgrade module. Still further, a user upgradable computing device may physically accommodate more than the depicted one power module. That way, a user may select several power modules possessing features best suited to the user's needs. Further yet, the power module may be user-upgradable itself with additional sub-modules so that a selected power module has a specific set of features desired by the user.

In various implementations, the computing devices that power modules 314, 414, 514, 614, 714, 814 of FIGS. 3-8 interface with are gaming devices, smart phones, tablet computers, laptop computers, personal computers, or any other discrete devices that carry out one or more specific sets of arithmetic and/or logical operations.

Figure 9:
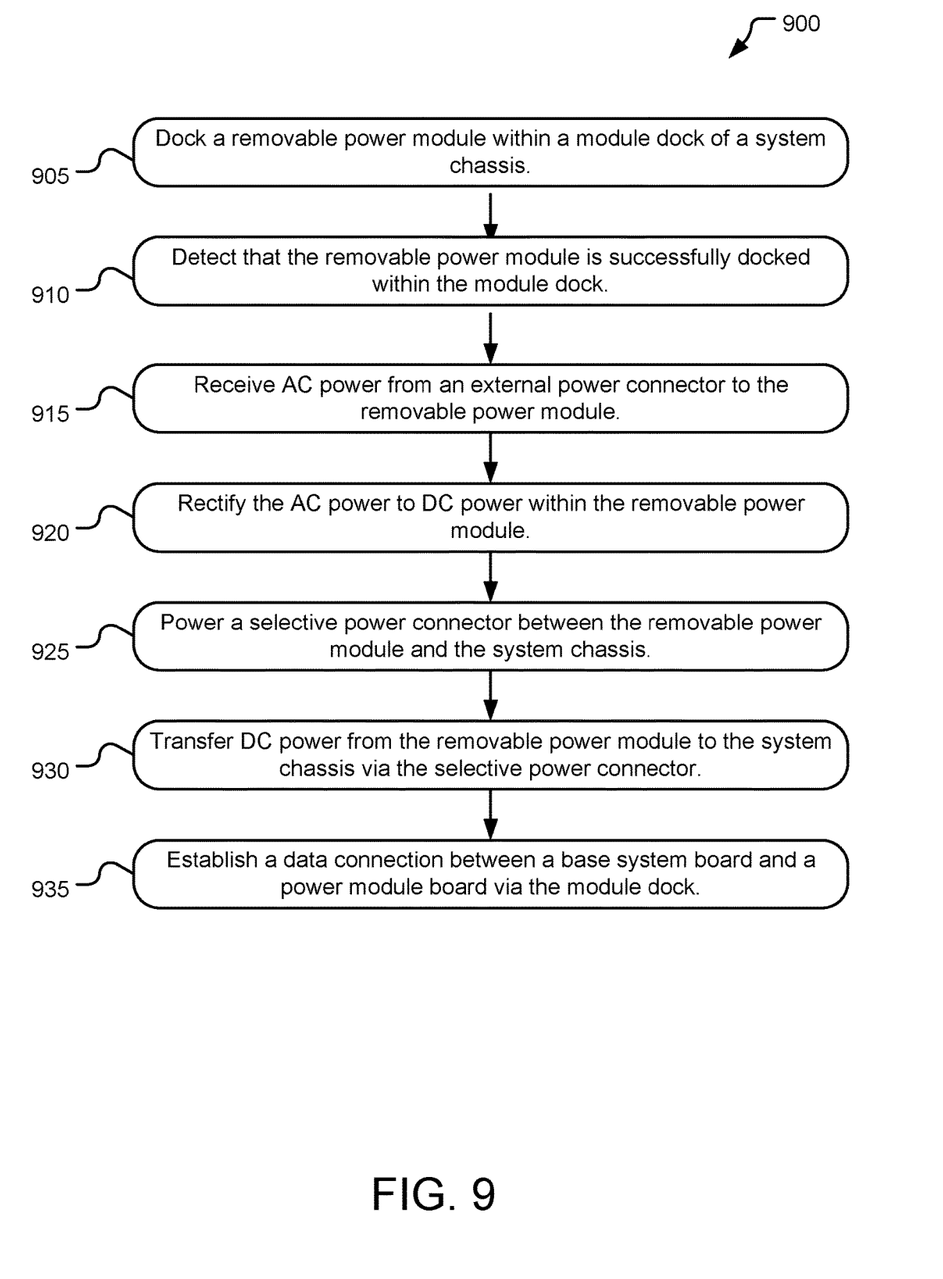
FIG. 9 illustrates example operations for powering a computing device with a removable power module.

FIG. 9 illustrates example operations 900 for powering a computing device with a removable power module. A docking operation 905 docks a removable power module within a module dock of a system chassis. The removable power module includes a power supply sized to provide sufficient power to operate the power module, a system board, and all other power-consuming components of the computing device with little to no excess power capacity. The removable power module may also include one or more performance enhancing features or components that supplement the performance of the system chassis alone. A user may physically slide, insert, or otherwise mechanically interface the power module with the module dock on the base unit to accomplish the docking operation 905.

In some implementations, the docking operation 905 includes a user removing a first removable power module from the computing device, selecting a second removable power module from a selection of one or more power modules available to the user, and installing the selected second power module into the computing device. In various implementations, the docking operation 905 also requires no specialized tools or knowledge on behalf of the user. In one implementation, the user may return the removed power module to the manufacturer of the computing device in exchange for a credit to be used against future purchases from the manufacturer. In another implementation, the user may return the removed power module to the manufacturer in exchange for a credit to be refunded from the purchase of the selected second power module, or yet another selected power module.

A detecting operation 910 detects that the removable power module is successfully docked within the module dock. The detecting operation 910 may be performed by a mechanical switch or sensor that indicates a successful docking of the power module in the module dock. A receiving operation 915 receives AC power from an external power connector to the removable power module. In various implementations, the AC power is provided from a common 110/120V AC source.

A rectifying operation 920 rectifies the AC power to DC power within the removable power module. In various implementations, the rectifying operation 920 is performed by one or more power supplies contained within the removable power module. In some implementations, the rectifying operation 920 occurs automatically responsive to the receiving operation 915.

A powering operation 925 powers a selective power connector between the removable power module and the system chassis. In some implementations, the powering operation 925 is conditional on a successful detection operation 910. In other implementations, the powering operation 925 occurs automatically responsive to the rectifying operation 920.

A transferring operation 930 transfers DC power from the removable power module to the system chassis via the selective power connector. For example, the transferring operation 930 may conduct DC power through the selective power connector, which conductively connects the removable power module to the system chassis at the module dock.

An establishing operation 935 establishes a data connection between a base system board and a power module board via the module dock. The base system board is contained within the system chassis and the power module board is contained within the removable power module. Thus, the establishing operation 935 communicatively links the system chassis to the removable power module. The data connection may be established via a physical data connector, or a near-field, high-speed wireless connection, for example.

In various implementations, the computing devices described in detail herein are gaming devices, smart phones, tablet computers, laptop computers, personal computers, or any other discrete devices that carry out one or more of the aforementioned operations or other specific sets of arithmetic and/or logical operations. The logical operations making up the implementations described herein are referred to variously as operations, steps, objects, or modules. Furthermore, the logical operations may be performed in any order, adding or omitting operations as desired, unless explicitly claimed otherwise or a specific order is inherently necessitated by the claim language.

An example computing device according to the presently disclosed technology includes a system chassis with a module dock and a base system board to provide computing functionality to the computing device. The example computing device further includes a removable power module. The removable power module includes an external power connector to receive AC power into the removable module, a power supply to rectify the received AC power to DC power to operate the removable power module and the system chassis, and a selective power connector to the base system board via the module dock.

In another example computing device, the power supply is sized to satisfy a total power requirement of the system chassis and the removable power module.

In another example computing device, the module dock is to removably receive the removable power module.

In another example computing device, the removable power module further includes a power module board incorporating a performance enhancing component.

In another example computing device, the performance enhancing component includes one or more of a CPU, GPU, memory, data storage, and additional physical connectors.

In another example computing device, the base system board and the power module board share one or both of a common virtual addressing space and a common programming model.

In another example computing device, the removable power module further includes a selective data connector between the base system board and the power module board via the module dock.

Another example computing device further includes a switch to trigger connection of the data connector between the base system board and the expansion system board responsive to proximity of the removable power module to the expansion dock.

In another example computing device, the removable power module includes a switch to trigger connection of the rectified DC power to the module dock responsive to proximity of the removable power module to the module dock.

In another example computing device, the system chassis includes a system thermal solution.

In another example computing device, the removable power module includes a module thermal solution that operates one of: dependent upon the system thermal solution, independent of the system thermal solution, and complementary with the system thermal solution.

In another example computing device, the computing device is a gaming console.

An example method of powering a computing device according to the presently disclosed technology includes docking a removable power module within a module dock of a system chassis, receiving AC power from an external power connector to the removable power module, rectifying the AC power to DC power within the removable power module, and transferring DC power from the removable powered module to the system chassis via a selective power connector to a base system board within the system chassis.

Another example method further includes establishing a data connection between the base system board and a power module board via the module dock.

Another example method further includes removing an initial power module from the module dock of the computing device, and selecting the removable power module from a selection of available removable power modules.

In another example method, prior to the transferring operation, the method further includes detecting that the removable power module is successfully docked within the module dock, and powering the selective power connector responsive to the detecting operation.

In another example method, the docking operation includes connecting the selective power connector to the base system board via the module dock.

Another example method further includes returning the removable power module to a manufacturer of the modular computing device in exchange for a credit against future purchases from the manufacturer.

Another example method further includes returning the removable power module to a manufacturer of the modular computing device in exchange for a credit against the purchase of another removable power module from the manufacturer.

An example computing device according to the presently disclosed technology includes a system chassis and a removable power module. The system chassis includes a module dock and a base system board to provide computing functionality to the computing device. The removable power module includes an external power connector to receive AC power into the removable power module, a power supply to rectify the received AC power to DC power to operate the removable power module and the system chassis, a selective power connector to the base system board via the module dock, a power module board incorporating a performance enhancing component, and a selective data connector between the base system board and the power module board via the module dock.

What is claimed is:

1. A computing device comprising:
    a system chassis including a module dock and a base system board including a processor to provide computing functionality to the computing device; and
    a removable power module including:
        an external power connector to receive AC power into the removable module;
        a power supply to rectify the received AC power to DC power to operate the removable power module and the system chassis;
        a selective power connector to the base system board via the module dock; and a power module board incorporating a performance enhancing component to enhance the computing functionality of the base system board.

2. The computing device of claim 1, wherein the power supply is sized to satisfy a total power requirement of the system chassis and the removable power module.

3. The computing device of claim 1, wherein the module dock is to removably receive the removable power module.

4. The computing device of claim 1, wherein the computing performance enhancing component includes one or more of a CPU, GPU, memory, and data storage.

5. The computing device of claim 1, wherein the base system board and the power module board share one or both of a common virtual addressing space and a common programming model.

6. The computing device of claim 1, wherein the removable power module further includes a selective data connector between the base system board and the power module board via the module dock.

7. The computing device of claim 6, further comprising:
a switch to trigger connection of the data connector between the base system board and the power module board responsive to proximity of the removable power module to the module dock.

8. The computing device of claim 1, wherein the removable power module includes a switch to trigger connection of the rectified DC power to the module dock responsive to proximity of the removable power module to the module dock.

9. The computing device of claim 1, wherein the system chassis includes a system thermal solution.

10. The computing device of claim 9, wherein the removable power module includes a module thermal solution that operates one of: dependent upon the system thermal solution, independent of the system thermal solution, and complementary with the system thermal solution.

11. The computing device of claim 1, wherein the computing device is a gaming console.

12. A method of powering a computing device, the method comprising:
docking a removable power module within a module dock of a system chassis;
receiving AC power from an external power connector to the removable power module;
rectifying the AC power to DC power within the removable power module;
transferring DC power from the removable power module to the system chassis via a selective power connector to a base system board including a processor to provide computing functionality to the computing device within the system chassis; and
establishing a data connection between the base system board and a power module board incorporating a performance enhancing component to enhance the computing functionality of the base system board via the module dock.

13. The method of claim 12, wherein the docking operation includes:
removing an initial power module from the module dock of the computing device; and
selecting the removable power module from a selection of available removable power modules.

14. The method of claim 12, wherein prior to the transferring operation, the method further comprises:
detecting that the removable power module is successfully docked within the module dock; and
powering the selective power connector responsive to the detecting operation.

15. The method of claim 12, wherein the docking operation includes connecting the selective power connector to the base system board via the module dock.

16. The method of claim 12, further comprising:
returning the removable power module to a manufacturer of the modular computing device in exchange for a credit against future purchases from the manufacturer.

17. The method of claim 12, further comprising:
returning the removable power module to a manufacturer of the modular computing device in exchange for a credit against the purchase of another removable power module from the manufacturer.

18. A computing device comprising:
a system chassis including a module dock and a base system board including a processor to provide computing functionality to the computing device; and
a removable power module including:
an external power connector to receive AC power into the removable power module;
a power supply to rectify the received AC power to DC power to operate the removable power module and the system chassis;
a selective power connector to the base system board via the module dock;
a power module board incorporating a performance enhancing component to enhance the computing functionality of the base system board; and
a selective data connector between the base system board and the power module board via the module dock.

* * * * *